United States Patent
Di Marco et al.

(10) Patent No.: US 9,980,207 B2
(45) Date of Patent: May 22, 2018

(54) DELAYED RESPONSE TO REQUESTING DEVICE

(71) Applicant: Telefonaktiebolaget LM Ericsson (publ), Stockholm (SE)

(72) Inventors: Piergiuseppe Di Marco, Sollentuna (SE); Jingcheng Zhang, Norrköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days. days.

(21) Appl. No.: 15/100,425

(22) PCT Filed: May 3, 2016

(86) PCT No.: PCT/SE2016/050398
§ 371 (c)(1),
(2) Date: May 31, 2016

(87) PCT Pub. No.: WO2016/178623
PCT Pub. Date: Nov. 10, 2016

(65) Prior Publication Data
US 2017/0127341 A1    May 4, 2017

Related U.S. Application Data

(60) Provisional application No. 62/156,611, filed on May 4, 2015.

(51) Int. Cl.
*H04W 48/12* (2009.01)
*H04W 72/04* (2009.01)
(Continued)

(52) U.S. Cl.
CPC .......... *H04W 48/12* (2013.01); *H04W 4/008* (2013.01); *H04W 48/16* (2013.01); *H04W 72/0446* (2013.01); *H04W 74/08* (2013.01)

(58) Field of Classification Search
CPC . H04W 48/12; H04W 48/16; H04W 72/0446; H04W 74/08; H04W 4/008
See application file for complete search history.

(56) References Cited

U.S. PATENT DOCUMENTS 9,402,243 B2 * 7/2016 Cherian .............. H04W 72/005
2013/0044658 A1 2/2013 Zhu et al.
(Continued)

FOREIGN PATENT DOCUMENTS

WO 2013063594 A1 5/2013
WO 2013184889 A1 12/2013

*Primary Examiner* — Jamal Javaid
(74) *Attorney, Agent, or Firm* — Coats & Bennett, PLLC

(57) ABSTRACT

A responding device (14) is configured to transmit messages at transmission opportunity times that occur substantially periodically according to a transmission interval. Configured in this way, the responding device (14) receives a request message (16) from a requesting device (12) in a wireless communication system (10). Responsive to the request message (16), the responding device (14) determines to transmit a response message (18) at a response time that is distinct from any of the transmission opportunity times and that occurs after at least the transmission interval has passed since receiving the request message (16). The responding device (14) in this regard delays transmission of the response message (18) until the response time, by refraining from transmitting the response message (18) at one or more transmission opportunity times that occur after receiving the request message (16) but before the response time. The responding device (14) then transmits the response message (18) at the response time.

40 Claims, 7 Drawing Sheets

(51) Int. Cl.
*H04W 74/08* (2009.01)
*H04W 4/00* (2018.01)
*H04W 48/16* (2009.01)

(56) References Cited

U.S. PATENT DOCUMENTS

| | | | |
|---|---|---|---|
| 2013/0155931 A1* | 6/2013 | Prajapati | H04W 72/044 370/311 |
| 2013/0294354 A1* | 11/2013 | Zhang | H04W 72/04 370/329 |
| 2014/0329498 A1 | 11/2014 | Cherian et al. | |

* cited by examiner

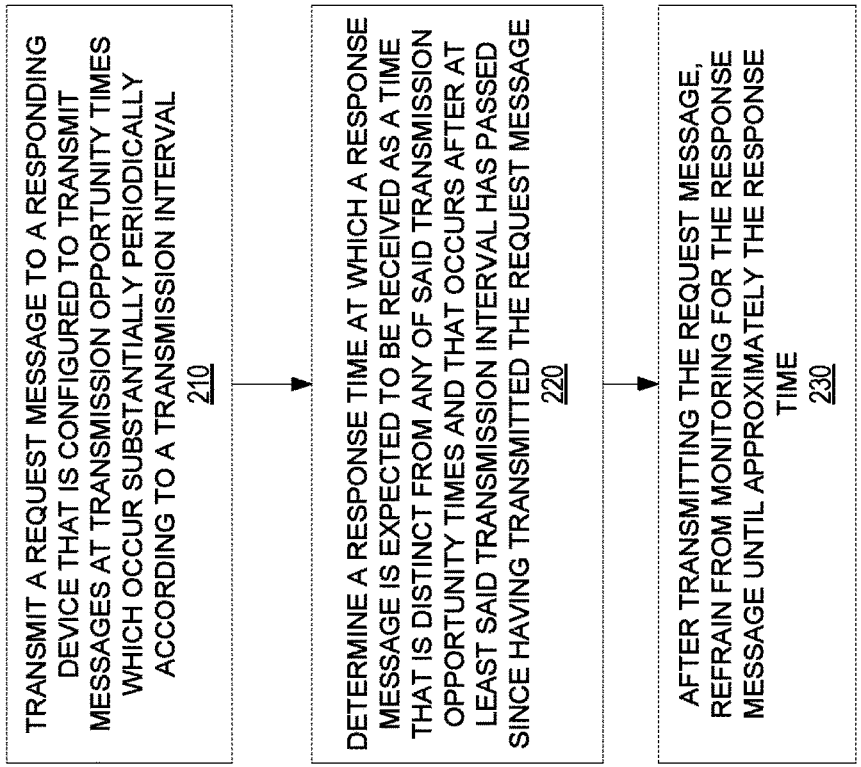
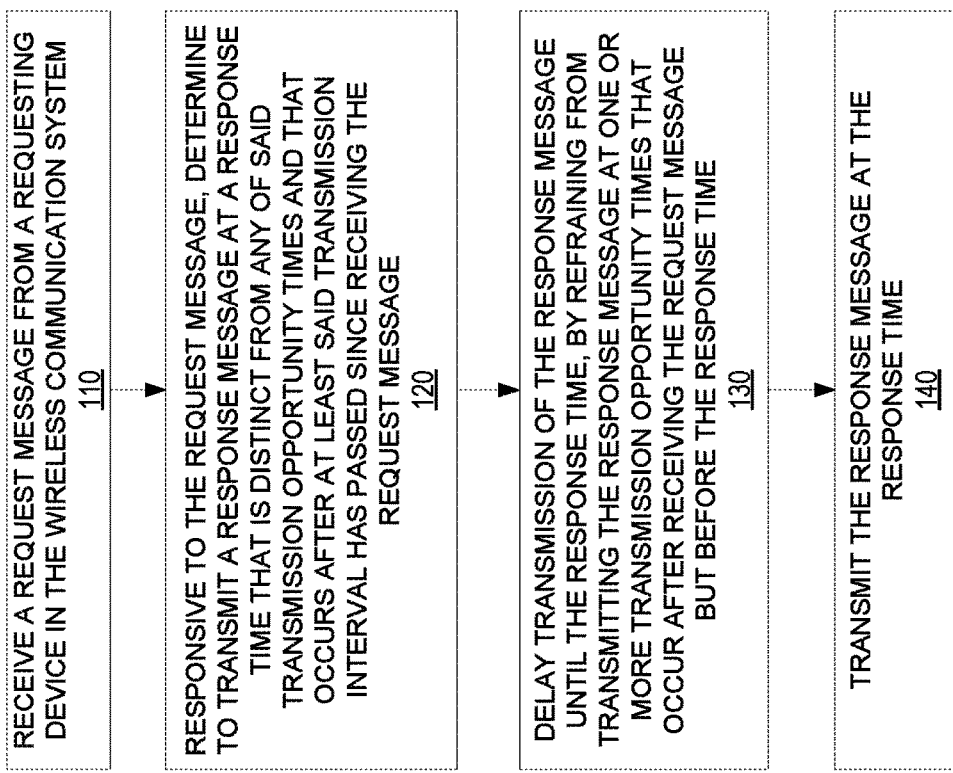
FIGURE 3
FIGURE 2

DELAYED RESPONSE TO REQUESTING DEVICE

TECHNICAL FIELD

The present application relates generally to a wireless communication system, and particularly to message transmission in the system when such transmission is configured to occur at substantially periodic transmission opportunity times.

BACKGROUND

Energy-efficiency and maintenance are fundamental design criteria for the development of wireless standards for the future Internet of Things. This is typically achieved by designing asymmetric communication links. Battery-powered devices with low complexity, low cost, and low computational capabilities are wirelessly connected to powerful devices with high complexity, cost, and computational capabilities. Examples of short range technologies based on this paradigm are Bluetooth Low Energy (BLE), WiFi, and ZigBee.

BLE is a wireless personal area network technology based on single-hop client/server type of connections. Compared to Classic Bluetooth, BLE is intended to provide considerably reduced power consumption and cost. The Bluetooth SIG identifies a number of markets for BLE technology, particularly in the smart home, health and fitness sectors, with a great potential as an enabling technology for the Internet of Things.

A low power network is composed of a number of powerful routers and battery-powered end-devices. For applications such as smart home and fitness, low latency is not a stringent requirement. Sensed information or actuation commands require time constraints in the order of hundreds of milliseconds, which is of orders of magnitude larger than the typical time on the air for the corresponding generated packets.

In order to save energy and avoid costly centralized management, devices use asynchronous communication and contention-based channel access. As an example, BLE allows devices to communicate information through advertisement messages sent in the air, without establishing a data connection. An end device is usually powered with a low capacity battery with reduced computation power. Routers by contrast are usually mains powered and provide message forwarding, rerouting and self-healing functionalities for the established network. In order to discover routers in the neighborhood, or update information to the current router in the neighborhood, end-devices need to exchange signaling messages with such routers. When advertisement messages are used for such signaling messages, there are standard rules to comply with.

For BLE, the specifications set a minimum interval between consecutive advertising events, and this interval varies depending on the type of advertisement from few to hundreds of milliseconds. According to the current BLE specification, if an end-device sends a request message to a router that is engaging communications through advertisements, the end-device needs to wait before getting a response for a time that depends on the minimum interval between consecutive advertising events in the router side. In the worst case, if the router has just sent an advertisement right before receiving the request message, it needs to wait a time equal to the interval between consecutive advertising events before sending the response.

SUMMARY

One or more embodiments herein recognize and address certain problems with known approaches to coordinating requests and responses between devices, e.g., in an asynchronous communication system with a minimum period between consecutive packet transmissions. Current approaches, for example, require the requesting device to continually monitor for a response from the responding device. This causes a long awake time for the device waiting for the response, and therefore greatly increases the device's power consumption. This proves especially true when the device to which the request is sent has to take time to exchange packets with other devices in order to generate the response (e.g., such as when the request is for a neighbor/route discovery process). When the requesting device is battery powered, this translates into significantly reduced battery lifetime. Indeed, an additional awake period of hundred milliseconds per hour in some scenarios can halve the battery lifetime, e.g., if the device is powered by a coin cell battery. This problem applies to any standard and/or regulation for which a minimum time between consecutive packet transmissions is set.

One or more embodiments herein address these and other problems by, for example, configuring the requesting and responding devices to effectively agree on or otherwise coordinate the time at which the response will be sent, while still complying with the minimum interval required between the responding device's transmissions. The requesting device exploits its knowledge of the time at which the response will be sent in order to refrain from monitoring for that response until then. The requesting device may, for instance, enter a sleep mode or some other power conservation state until the time that it needs to wake up for receiving the response.

In some embodiments, the requesting device is a battery powered end-device and the responding device is a mains powered router (e.g., always on, without critical constraints). In this and other cases, embodiments include a method of coordinating request/response type of messages between end-devices and routers in the presence of limitations on the minimum period between consecutive packet transmissions. Both end-device and router know the minimum period between consecutive packet transmissions. When a request is sent by the end-device, the router does not respond immediately but it delays its response to a target time that is at least equal to the minimum period between consecutive packet transmissions, so that it can guarantee that the response will be sent at the target time. The end-device then is able to go to sleep mode and to wake up at the target time, thus avoiding unnecessary awake periods.

In one embodiment, the end-device requests the router to start a neighbour discovery procedure in order to find a path to a predefined destination. Then, the target time is set to be sufficiently long to allow the router to perform neighbour discovery and include the requested information into the response.

Some embodiments therefore match the time interval between receiving a request from a battery-powered device and sending the corresponding response with a delay larger than the minimum advertising interval, so that the battery-powered device sleeps and save energy. Moreover, the router can perform additional actions based on the request.

Accordingly, at least some embodiments herein advantageously reduce the energy consumption of battery-powered end devices in low power networks and therefore extend their battery life. Moreover, while the end-device is asleep, the router can perform additional actions (e.g., neighbor discovery) on behalf of the end-device and embed information on the result in its response.

BRIEF DESCRIPTION OF THE DRAWINGS

FIG. 2 is a logic flow diagram of a method performed by a responding device according to one or more embodiments.

FIG. 3 is a logic flow diagram of a method performed by a requesting device according to one or more embodiments.

DETAILED DESCRIPTION

Figure 1:
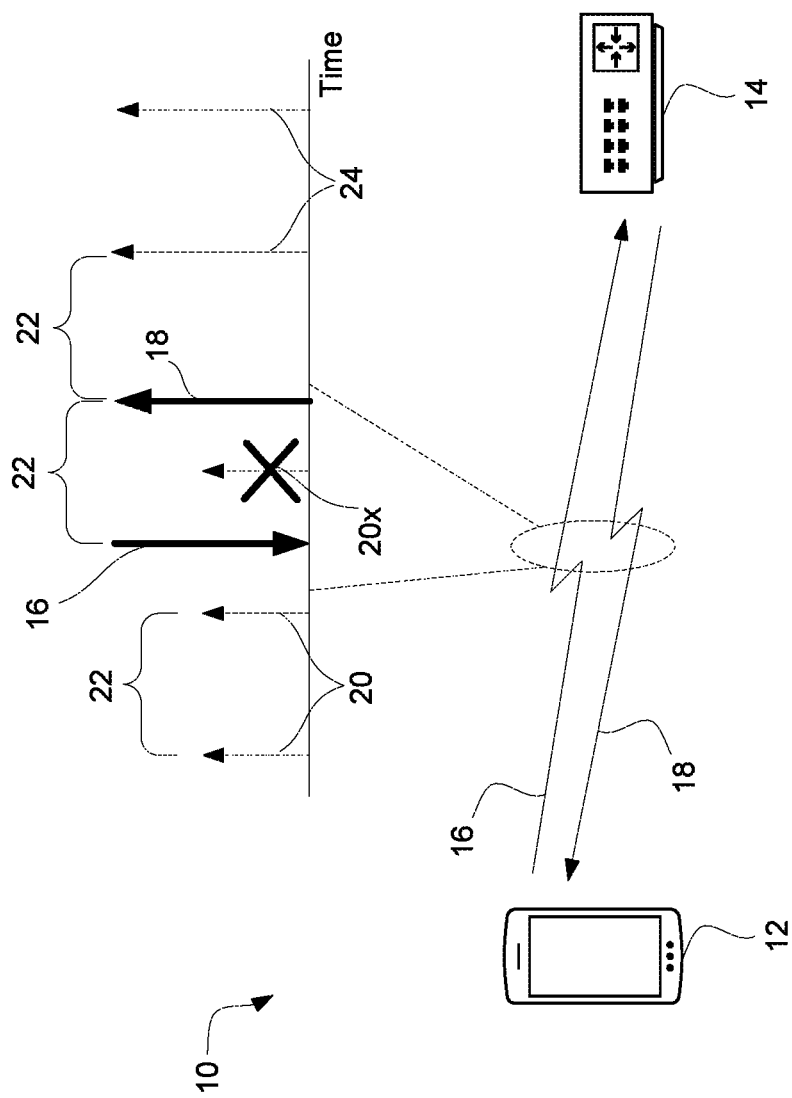
FIG. 1 is a block diagram of a wireless communication system according to one or more embodiments.

FIG. 1 shows a wireless communication system 10 (e.g., a Bluetooth Low Energy, BLE, system) according to one or more embodiments. The system 10 includes a requesting device 12 shown for example as a battery powered end-device, and also includes a responding device 14 shown as a mains-powered router. The requesting device 12 is configured to transmit a request message 16 to the responding device 14. This request message 16 may be for instance a request for the responding device 14 to perform neighbor or route discovery. Regardless of the particular nature of the request message 16, though, the responding device 14 is configured to respond to that request message 16 by transmitting a response message 18 to the requesting device 12.

The responding device 14 in this regard is configured to transmit messages at certain transmission opportunity times 20. These transmission opportunity times 20 occur substantially periodically according to a transmission interval 22. In at least some embodiments, this transmission interval 22 is configured (e.g., at an application layer) to be at least a minimum interval required between successive (i.e., consecutive) transmissions by the responding device 14, e.g., as specified by a governing technology (e.g., BLE) standard. The transmission interval 22 may thereby impose constraints on how often the responding device 14 is permitted to transmit, e.g., in the midst of contention with one or more other devices for transmission resources.

If the responding device 14 were to transmit the response message 18 at the next transmission opportunity that occurs after its receipt of the request message 16, the amount of delay between when the requesting device 12 transmits the request message 16 and thereafter receives the response message 18 would vary depending on exactly when the request message 16 is sent. If the request message's transmission is approximately synchronized with one of the transmission opportunity times 20, the delay would be approximately equal to the transmission interval 22. But if the request message's transmission is not synchronized with the transmission opportunity times 20, the delay would be some amount less than the transmission interval 22 depending on how far into the interval 22 the request message 16 was sent. This uncertainty regarding the timing of the response message's receipt would otherwise require the requesting device 12 to continuously monitor for the response message 18. This would in turn cause a long awake time for the requesting device 12, and therefore increase the device's power consumption.

According to one or more embodiments herein, though, the responding device 14 and requesting device 12 are configured to perform the respective methods 100, 200 shown in FIGS. 2 and 3. As shown in FIG. 2, the method 100 performed by the responding device 14 comprises receiving the request message 16 from the requesting device 12, as described above (Block 110). The method 100 also notably includes, responsive to the request message 16, determining to transmit the response message 18 at a response time that is distinct from any of the transmission opportunity times 20 and that occurs after at least the transmission interval 22 has passed since receiving the request message 16 (Block 120). The method 100 further includes delaying transmission of the response message 18 until this determined response time, by refraining from transmitting the response message 18 at one or more transmission opportunity times 20 that occur after receiving the request message 16 but before the response time (Block 130). As shown in FIG. 1, for example, the responding device 14 refrains from transmitting the response message at transmission opportunity time 20x, in favor of transmitting the response message 18 at a time that occurs after the transmission interval 22 has passed since receiving the request message 16. Regardless, the method 100 further comprises transmitting the response message 18 at the response time (Block 140).

In some embodiments, this amounts to the responding device 14 delaying or foregoing transmission opportunities in order to provide the requesting device 12 with more certainty about when the responding device 14 will transmit its response message 18. In one or more embodiments, for example, the requesting device 12 also determines the response time, so that the requesting device 14 can refrain from monitoring for the response message 18 until that response time. FIG. 3 shows the corresponding method 200 implemented by the requesting device 12 in this regard.

As shown, the method 200 includes transmitting the request message 16 to a responding device 14 that transmits messages at transmission opportunity times 20 which occur substantially periodically according to a transmission interval 22 (Block 210). Again, this interval 22 in some embodiments is configured to be at least a minimum interval required between successive transmissions by the responding device 14. Regardless, the method 200 further includes determining a response time at which a response message 18 is expected to be received as a time that is distinct from any of the transmission opportunity times 20 and that occurs after at least the transmission interval 22 has passed since having transmitted the request message 16 (220). The method 22 then notably entails, after transmitting the request message, refraining from monitoring for the response message 18 until approximately the response time (Block 230).

Accordingly, at approximately the response time, the requesting device 12 may monitor for the response message 18.

In at least some embodiments, refraining from monitoring for the response message 18 until approximately the response time conserves the requesting device's power. In one embodiment, for example, the requesting device 12 is capable of operating in an awake mode or a sleep mode, with the device 12 consuming less power in the sleep mode than in the awake mode, e.g., because the device 12 activates its receiver in awake mode but not sleep mode. The requesting device 12 may, for example, monitor for messages from the responding device 14 in the awake mode but not in the sleep mode. Regardless, the requesting device 12 transitions from the awake mode to the sleep mode responsive to transmitting the request message 16, and transitions from the sleep mode to the awake mode at approximately the response time. This advantageously conserves the device's power until when it is needed to receive the response message 18.

In one or more embodiments, the devices 12, 14 determine the response time based on a time at which the request message 16 is transmitted or received. For example, in one embodiment as shown in FIG. 1, the devices 12, 14 determine the response time as being one transmission interval 22 after the request message 16 was transmitted or received. This way, the responding device 14 will be guaranteed to be able to transmit the response message 18 at the response time, without violating a requirement that successive transmissions by the responding device be separated in time by the transmission interval 22. In fact, the responding device 14 may effectively delay transmission of the response message 18 for longer than otherwise required, as needed to provide certainty regarding when the message 18 will be transmitted.

In some embodiments, the responding device 14 accomplishes this by at least temporarily abandoning the substantially periodic timing with which it made transmissions before receiving the request message 16, in favor of re-establishing that substantially periodic timing based on its reception of the request message 16. That is, new periodic timing is initiated or otherwise founded based on the timing of the request message's reception, rather than the timing of the last transmission. In at least some embodiments, therefore, the responding device 14, after transmitting the response message 18, resumes transmitting messages at transmission opportunity times 24 that occur substantially periodically after the response time according to the transmission interval 22 (as shown in FIG. 1).

In any event, although the response time may be determined to be one transmission interval 22 after the request message 16 was transmitted or received, as described above, the response time may be determined to be any number of transmission intervals 22. For example, one or both of the devices 12, 14, may determine the response time based on which actions the responding device 14 is triggered to perform in response to the request message 16. In this case, the response time occurs after an opportunity for the responding device 14 to perform those actions. In one embodiment, for example, the devices 12, 14 determine the response time as being multiple transmission intervals 22 after the request message 16 was transmitted or received. This way, the responding device 14 will have enough time to perform the required actions (e.g., neighbor discovery) and respond, without violating the requirement that successive transmissions by the responding device 14 be separated in time by the transmission interval 22.

Alternatively or additionally, the response time may be determined by either or both of the devices 12, 14 based on a transmission format and/or transmission mechanism specified for the response message 18. Transmission formats may differ for instance based on the type of information included in the request message 16 and/or the response message 18. Alternatively or additionally, transmission formats may differ depending on whether the request message 16 is connectable or non-connectable. In these and other embodiments, one or both of the devices 12, 14 may be configured to calculate the response time according to predefines rules that deterministically specify the response time, e.g., according to adopted standards.

By contrast, in at least some embodiments, the requesting device 12 indicates the response time in the request message 16 so as to inform the responding device 14 about the response time. In general, therefore, the target time can be implicitly assumed by the specification (based on the packet format and transmission mechanism used for responses), configured for the participating devices, or sent as a parameter in the request message.

No matter the particular way in which the response time is determined, therefore, the requesting and responding devices 12, 14 effectively agree on or otherwise coordinate the time at which the response will be sent, e.g., as a pre-negotiated period of time or future interval since transmission of the request message 16. This coordination or negotiation may be done for instance to ensure compliance with any minimum interval required between the responding device's transmissions, while also providing certainty for the timing of the response message 18. This way, the requesting device 12 may exploit its knowledge of the time at which the response message 18 will be sent in order to refrain from monitoring for that response until then. The requesting device 12 may, for instance, enter a sleep mode or some other power conservation state until the time that it needs to wake up for receiving the response. That is, after a target time, the requesting device 12 wakes up and listens for incoming responses. If a response is received, the requesting device 12 processes it and may go back to sleep, or perform other tasks.

In at least some embodiments, the requesting device 12, responsive to monitoring for the response time message 18 at approximately the response time but not receiving the response message 18 within a defined maximum monitoring period (e.g., a maximum awake period), returns to refraining from monitoring for the response message 18 (e.g., by returning to sleep mode or performing other tasks).

In one or more embodiments, the requesting device 12 may retry sending the request message 16. This may include re-initializing the request procedure with a new response (i.e., target) time. The new target time may be equal to or longer than the previous target time, as agreed by the specifications and by the type of request. This operation may be repeated until a timeout is fired. That is, in some embodiments, the device 12 may perform one or more rounds of monitoring and refraining from monitoring at each of multiple different candidate response times, e.g., as predefined based on when the request message 16 was transmitted or received.

In any case, though, the maximum monitoring period may in some embodiments be determined based on an estimated or assumed clock drift between the devices 12, 14. In particular, the maximum awake period may be calibrated based on the clock drift between the requesting device 12 and the responding device 14. For the first request, the requesting device 12 assumes the worst case clock drift of the responding device 14 due to the lack of clock accuracy information. An accurate value may then be included in the responding device 14 response for the following requests.

Note that, in one or more embodiments, the transmission opportunity times 20, 24 occur substantially periodically in the sense that they occur according to both a configured, fixed, or set transmission interval as well as a pseudo-random delay added to the transmission interval (e.g., to ensure that transmissions from different devices can coexist). The transmission interval in some embodiments for example may be fixed within the range from 20 ms to 10.24 seconds, e.g., in steps of 0.625 ms, and the pseudo-random delay may have a value from 0 ms to 10 ms so as to reduce the probability of collisions between transmissions from different devices. The transmission interval may be specified, e.g., at an application layer on a semi-static basis. The pseudo-random delay may dynamically vary, e.g., from transmission to transmission.

Although the above embodiments apply in any request/response scenario, at least some embodiments are applied in the context of advertising. For example, in one or more embodiments the transmission opportunity times 20, 24 comprise advertising opportunity times that occur periodically according to an advertising interval. The advertising interval may be configured to be at least a minimum interval required between successive transmissions by the responding device 14 associated with advertising.

Advertising in this sense can accomplish any number of purposes. For example, a device may transmit advertisements to broadcast promiscuously, to transmit signed data to a previously bonded device, to advertise its presence to a device wanting to connect, to reconnect asynchronously due to a local event, or the like.

In one specific example, the responding device 14 substantially periodically transmits non-connectable advertisements (e.g., advertisement packets) on one or more advertising channels indicating that it has data to communicate. The requesting device 12 may then request the responding device 14 to send a response, enabling broadcast communication on an advertising channel, or requesting to set up a connection between the devices 12, 14. When a connection is requested, the advertisement channel(s) serve to connect the devices 12, 14, which may then proceed to use data channel(s) for communication.

At least some embodiments below will be described in a context where the requesting device 12 is an end-device 26 and the responding device 14 is a router 28, e.g., in a BLE system with advertising. In one or more of these embodiments, routers are mains powered and always remain awake, meaning that they do not need to set a target time for inter-router communications.

For BLE, the specifications set a minimum interval between consecutive advertising events, and this interval varies depending on the type of advertisement from few to hundreds of milliseconds. According to the current BLE specification, if an end-device sends a request message to a router that is engaging communications through advertisements, the end-device needs to wait before getting a response for a time that depends on the minimum interval between consecutive advertising events in the router side. In the worst case, if the router has just sent an advertisement right before receiving the request message, it needs to wait a time equal to the interval between consecutive advertising events before sending the response.

Figure 4:
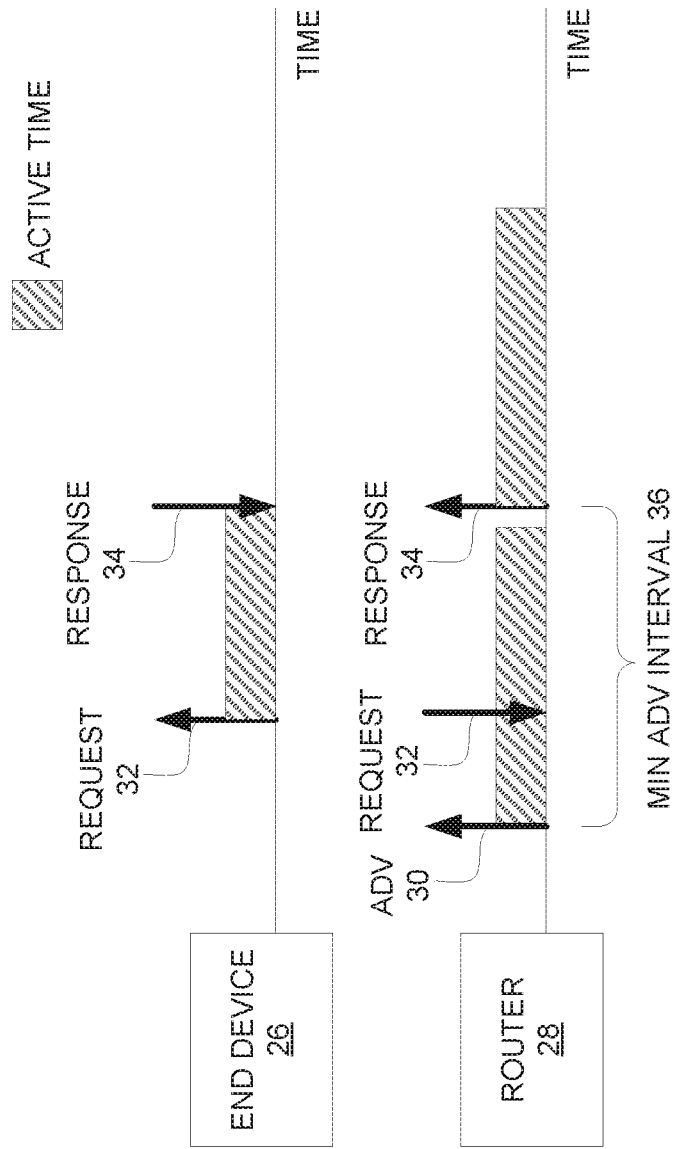
FIG. 4 is a timing diagram of message exchange between a requesting device in the form of an end device and a responding device in the form of a router according to know approaches.

A representation of the problem in this context is shown in FIG. 4. FIG. 4 depicts a conventional message flow for request/response messages between an end-device 26 and router 28. As shown, the end device 26 transmits a request 32, e.g., for neighbor or route discovery. The router 28 receives this request 32 in the middle of its configured advertising interval 36, shown here as being set to the minimum interval required. That is, the router 28 had previously transmitted an advertisement 30, and receives the request 32 before its configured advertising interval 36 expires. Response to the advertising interval 36 expiring, the router 28 transmits a response 34 to the request 32. Meanwhile, since this conventional approach produces uncertainty from the perspective of the end device 26 as to when the response 34 might be received, the end device 26 remains active or awake for the entire time between transmitting the request 32 and receiving the response 34 (e.g., in the sense that one or more of its receivers are active and monitoring for the response 34).

At least some embodiments herein depart from this conventional approach as described above, so that the end device 26 can transition to a non-active time between transmitting the request 32 and an expected response/target time.

Figure 5:
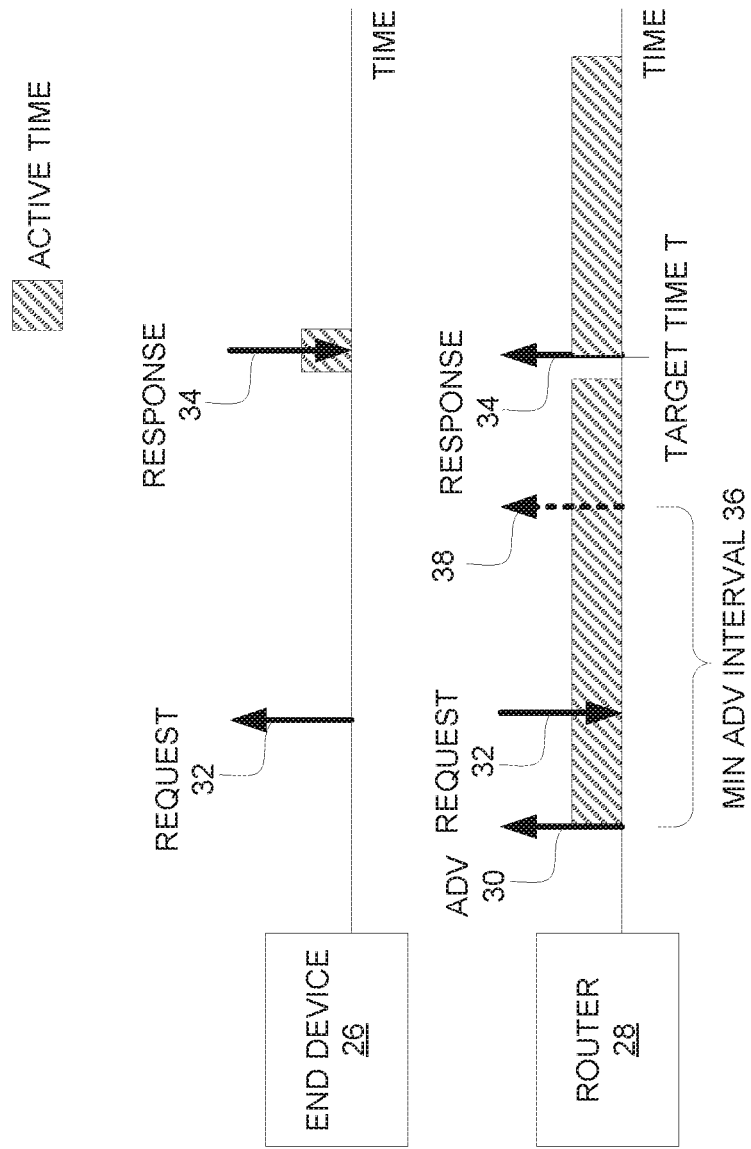
FIG. 5 is a timing diagram of message exchange between a requesting device in the form of an end device and a responding device in the form of a router according to one or more embodiments.

FIG. 5 illustrates one or more of these embodiments. FIG. 5 in this regard illustrates a message flow for request/response messages between the end device 26 and router 28, according to some embodiments herein, when the request 32 does not trigger additional messages from the router 28. As shown, the router 28 delays transmitting the response 34 until a target time T, rather than transmitting the response 34 at a transmission opportunity time 38 defined according to the router's advertising interval 36 as occurring after receiving the request message 32 (but before the target time T). In fact, this target time T is distinct from any such transmission opportunity times and occurs after at least the advertising interval 36 has passed since receiving the request message 32. In some embodiments, the router 28 does this by, upon reception of the request message 32 from the end-device 26 that needs a response, setting a timer to the target time T and refraining from sending advertisements until the timer elapses. At that time, the router 28 sends the response message 34 to the end device 26. After the advertising interval has elapsed, the router 28 may resume sending advertisements according to the previous periodic interval.

In some embodiments, the target time T is explicitly signaled by or is otherwise indicated by the request message 32. In other embodiments, the target time T is pre-negotiated or pre-defined, e.g., by one or more applicable standards. Either way, the end device 26 as shown exploits knowledge of the target time T at which the response message 34 will be transmitted, in order to transition to a sleep mode until that time occurs. This means that the end device 26 need only transition to the awake mode and monitor for the response message 34 at approximately or during a limited window of time around the target time T.

Figure 6:
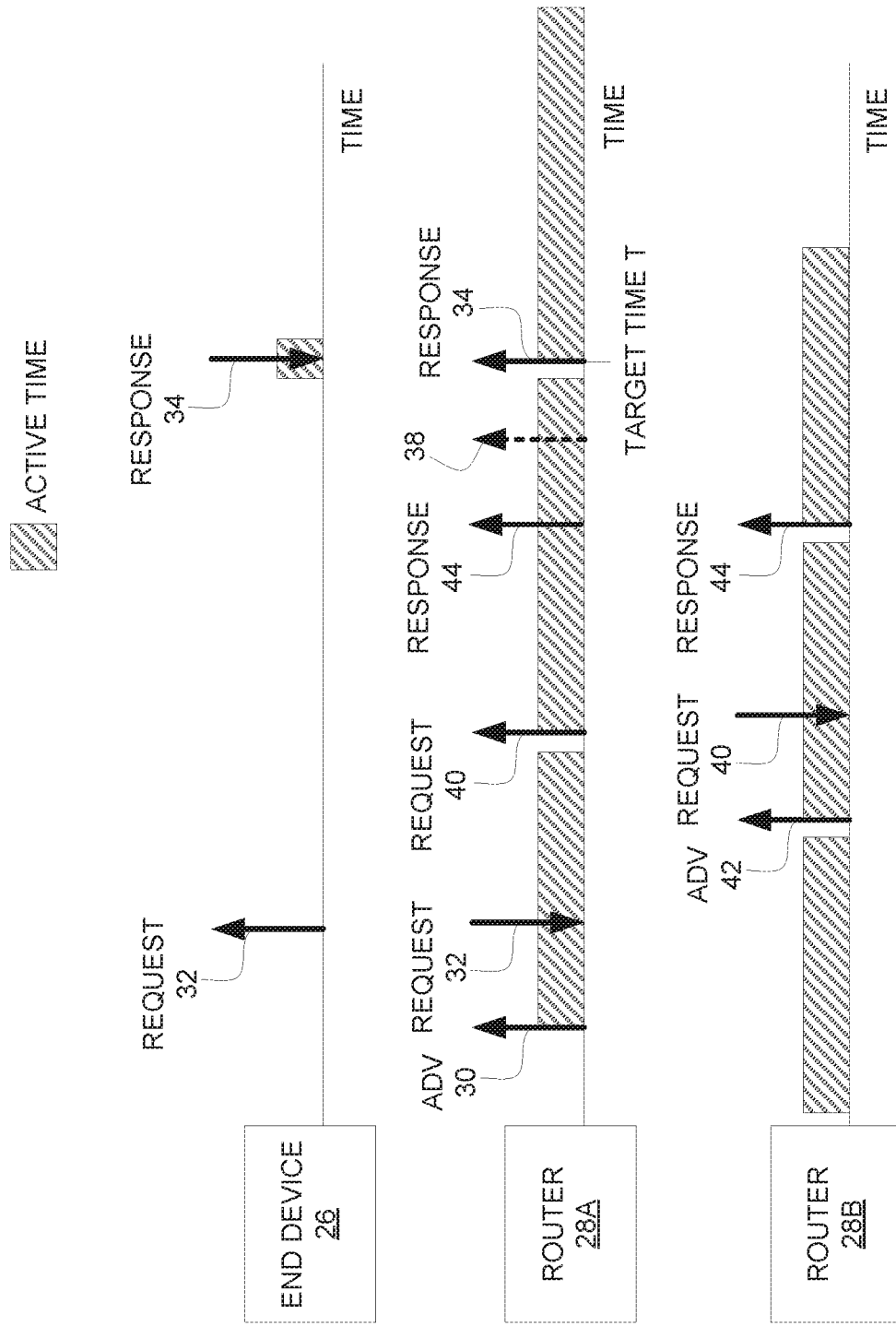
FIG. 6 is a timing diagram of message exchange between a requesting device in the form of an end device and a responding device in the form of a router according to one or more other embodiments.

FIG. 6 illustrates additional embodiments with a message flow for request/response messages between an end-device 26 and a router 28A, when the request 32 triggers an additional request 40 from the router 28A to another router 28B. In more detail, FIG. 6 shows that the router 28A transmits another request 40 (e.g., as part of neighbor or route discovery) to router 28B. The router 28A may do so for example at the next transmission opportunity time occurring after receipt of the request 32. Router 28B as shown receives this request 40 in the middle of its advertising interval, after having recently transmitted advertisement 42. Router 28B in turn transmits a corresponding response 44, e.g., at its next transmission opportunity time. Router 28A receives this response 44 from router 28B. However, rather than transmitting the response 44 at the next transmission opportunity time 38, router 28A delays transmission of the response 34 to the end device 26 until the target time T. Again, the end device 26 as shown exploits knowledge of the target time T at which the response message 34 will be transmitted, in order to transition to a sleep mode until that time occurs. This means that the end device 26 need only transition to the awake mode and monitor for the response message 34 at approximately or during a limited window of time around the target time T.

Although FIG. 6 illustrates one scenario requiring additional time for the router 28A to respond, other scenarios are possible besides the triggering of an additional request 40. In general, therefore, these embodiments are extendable to a request 32 triggering any additional actions (e.g., neighbor discovery) before sending the response message 34 to the end device 26 at the target time T.

Note that, for BLE devices, the advertisement mode is disabled upon reception of a request named "LE Set Advertise Enable Command" from the application layer. The command is defined in the BLE Core 4.x specifications. After sending the response, the same command can be used to resume the advertisement mode.

In at least some embodiments, the above approach saves significant battery power of the requesting device 12. For example, assume that a battery-powered device has 225 mAh coin cell battery, that the current consumption while the device is sleeping is 5 uA, and that the current consumption while active is equal to 15 mA. Also assume that the end-device sends requests every minute, i.e., 1 request every 60 seconds. And assume that the router sends messages and responses by using BLE non-connectable advertisements, which have minimum interval set to 100 ms, according to the Bluetooth specification Version 4.2 [Vol 2, Part E] page 968.

Without embodiments herein, since the end-device's request is asynchronous with respect to the advertisement interval, it is active for an average of 50 ms (half of the minimum interval) per transmitted request before receiving a response. The battery lifetime for the end-device is calculated as follows:

$$225 \text{ mAh}/(15 \text{ mA}*0.05 \text{ s}/60 \text{ s}+0.005 \text{ mA}*59.95 \text{ s}/60 \text{ s})=12860 \text{ h}\sim 1 \text{ year and 6 months.}$$

When implementing embodiments herein, the end device is assumed to be active for an average of 5 ms per transmitted request before receiving a response. 5 ms includes packet transmission time (~300 us) and conservative safeguards to protect against clock inefficiencies. According to the specification v4.0, the active timer accuracy in the router side should be equal or less than 50 ppm, where in the end device side, the sleep timer accuracy should be equal or less than 500 ppm. In such a case, a 5 ms interval allows the end device to wait for a response with target wakeup time which is 85 s in the worst case (5 ms–(300/1000)ms)/(550/1000000)=85 s. The battery lifetime for the end-device is then calculated as follows:

$$225 \text{ mAh}/(15 \text{ mA}*0.005 \text{ s}/60 \text{ s}+0.005 \text{ mA}*59.995 \text{ s}/60\text{s})=36002 \text{ h}\sim 3 \text{ years and 2 months.}$$

Figure 7:
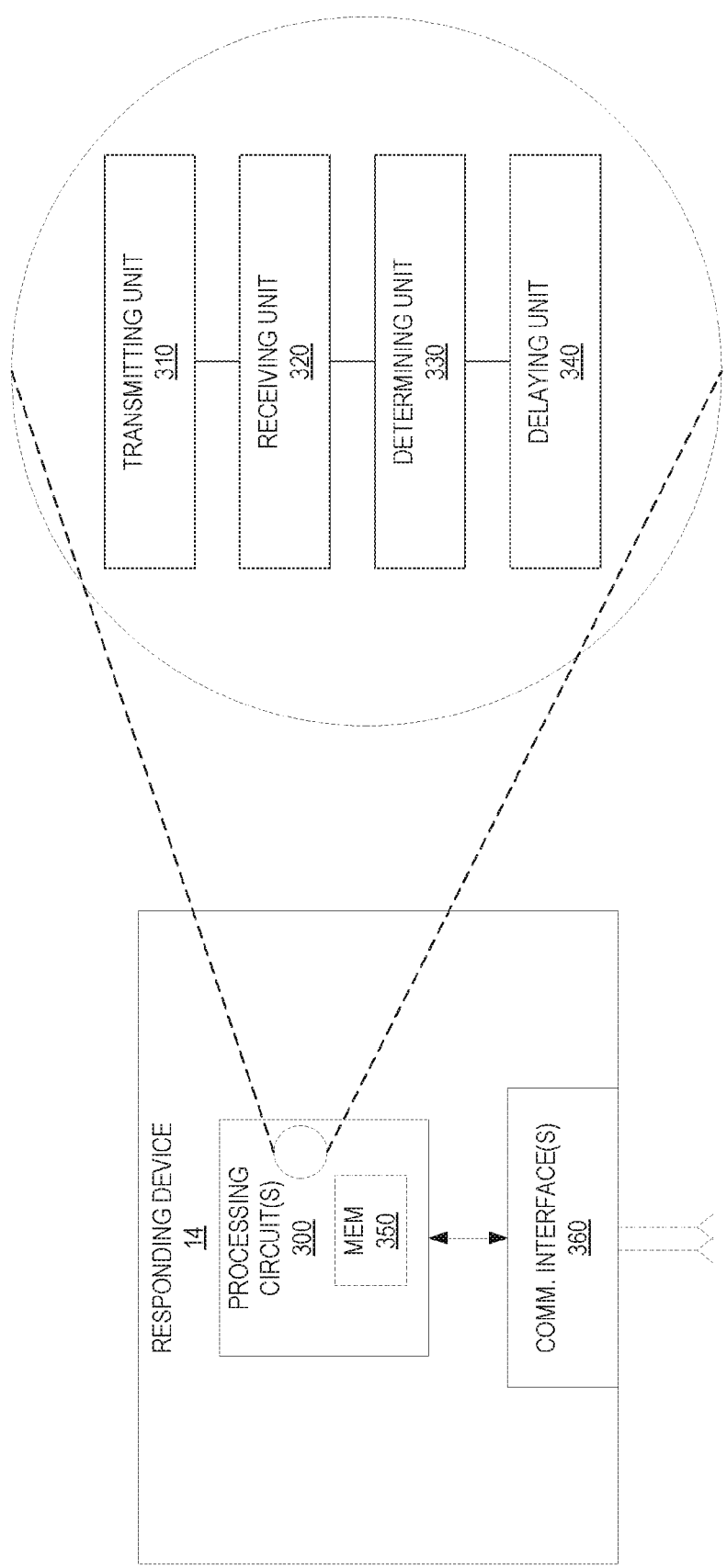
FIG. 7 is a block diagram of a responding device according to one or more embodiments.

With the above modifications and variations in mind, FIG. 7 illustrates additional details of a responding device 14 according to one or more embodiments. The responding device 14 is configured, e.g., via functional means or units, to implementing processing in FIG. 2. The responding device 14 in some embodiments for example, includes a transmitting means or unit 310, a receiving means or unit 320, a determining means or unit 330, and a delaying means or unit 340 configured to perform as described above. In particular, the receiving means or unit 320 is configured to, receive the request message 16 from the requesting device 12. The determining means or unit 330 is configured to, responsive to the request message 16, determine to transmit the response message 18 at a response time that is distinct from any of the transmission opportunity times 20 and that occurs after at least the transmission interval 22 has passed since receiving the request message 16. The delaying means or unit 340 is configured to delay transmission of the response message 18 until this determined response time, by refraining from transmitting the response message 18 at one or more transmission opportunity times 20 that occur after receiving the request message 16 but before the response time. The transmitting means or unit 310 is configured to transmit the response message 18 at the response time. The transmitting means or units 310 may also be configured to transmit messages at transmission opportunity times that occur substantially periodically according to a transmission interval.

In at least some embodiments, the responding device 14 comprises one or more processing circuits 300 configured to implement the processing in FIG. 2, such as by implementing the above described functional means or units. In one embodiment, for example, the processing circuit(s) 300 implement functional means or units as respective circuits. The circuits in this regard may comprise circuits dedicated to performing certain functional processing and/or one or more microprocessors in conjunction with memory 350. In embodiments that employ memory, which may comprise one or several types of memory such as read-only memory (ROM), random-access memory, cache memory, flash memory devices, optical storage devices, etc., the memory stores program code that, when executed by the one or more for carrying out one or more microprocessors, carries out the techniques described herein.

In one or more embodiments, the responding device 14 also comprises one or more communication interfaces 360. The one or more communication interfaces 360 include various components (not shown) for sending and receiving data and control signals. More particularly, the interface(s) 360 include a transmitter that is configured to use known signal processing techniques, typically according to one or more standards, and is configured to condition a signal for transmission (e.g., over the air via one or more antennas). Similarly, the interface(s) 360 include a receiver that is configured to convert signals received (e.g., via the antenna(s)) into digital samples for processing by the one or more processing circuits 300.

Figure 8:
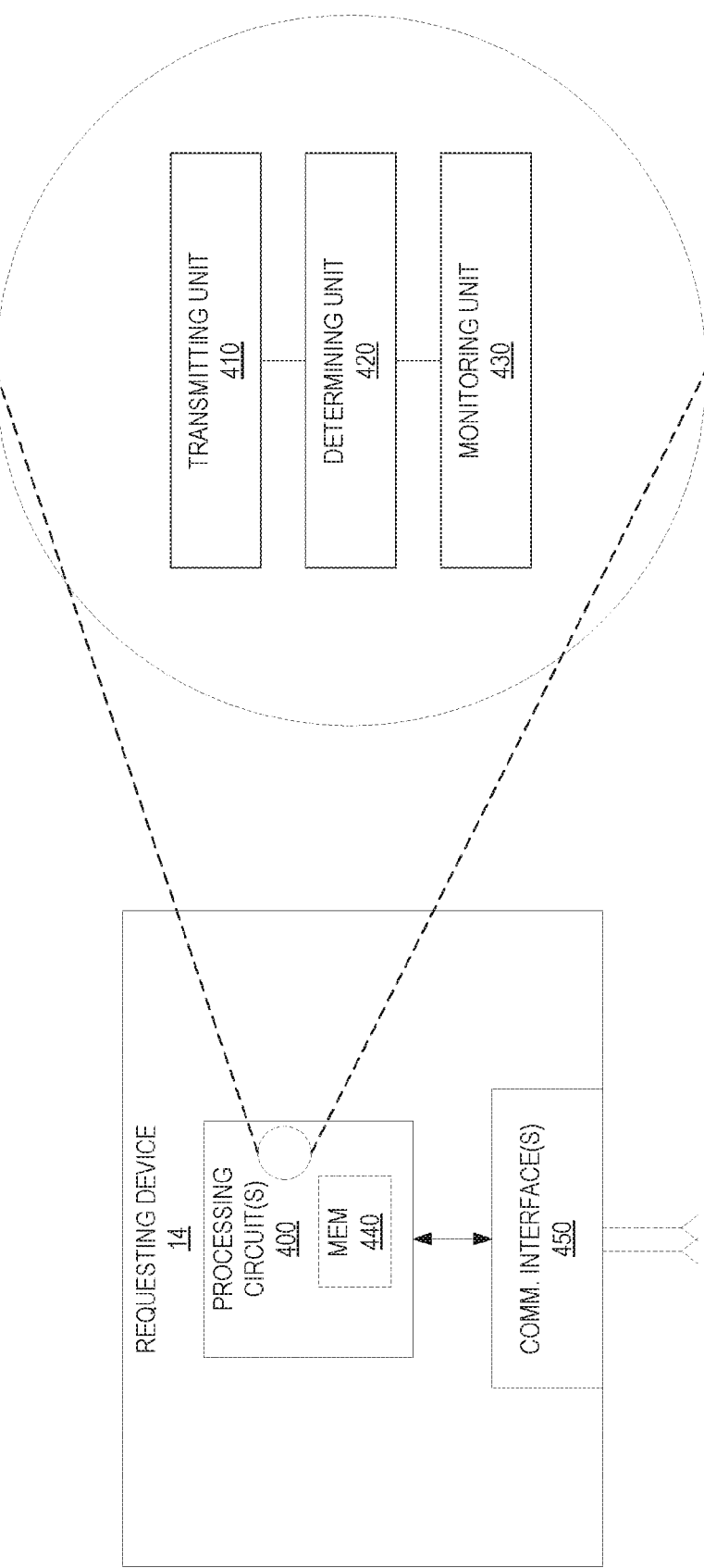
FIG. 8 is a block diagram of a requesting device according to one or ore embodiments.

FIG. 8 illustrates additional details of a requesting device 14 according to one or more embodiments. The requesting device 14 is configured, e.g., via functional means or units, to implementing processing in FIG. 3. The requesting device 14 in some embodiments for example, includes a transmitting means or unit 410, a determining means or unit 420, and a monitoring means or unit 430 configured to perform as described above. In particular, the transmitting means or unit 410 is configured to transmit a request message 16 to a responding device 14 that transmits messages at transmission opportunity times 20 which occur substantially periodically according to a transmission interval 22. The determining means or unit 420 is configured to determine a response time at which a response message 18 is expected to be received as a time that is distinct from any of the transmission opportunity times 20 and that occurs after at least the transmission interval 22 has passed since having transmitted the request message 16. The monitoring means or unit 430 is configured to after transmission of the request message, refrain from monitoring for the response message 18 until approximately the response time.

In at least some embodiments, the requesting device 14 comprises one or more processing circuits 400 configured to implement the processing in FIG. 3, such as by implementing the above described functional means or units. In one embodiment, for example, the processing circuit(s) 400 implement functional means or units as respective circuits. The circuits in this regard may comprise circuits dedicated to performing certain functional processing and/or one or more microprocessors in conjunction with memory 440. In embodiments that employ memory, which may comprise one or several types of memory such as read-only memory (ROM), random-access memory, cache memory, flash memory devices, optical storage devices, etc., the memory stores program code that, when executed by the one or more for carrying out one or more microprocessors, carries out the techniques described herein.

In one or more embodiments, the requesting device 14 also comprises one or more communication interfaces 450. The one or more communication interfaces 450 include various components (not shown) for sending and receiving data and control signals. More particularly, the interface(s) 450 include a transmitter that is configured to use known signal processing techniques, typically according to one or more standards, and is configured to condition a signal for transmission (e.g., over the air via one or more antennas). Similarly, the interface(s) 450 include a receiver that is configured to convert signals received (e.g., via the antenna(s)) into digital samples for processing by the one or more processing circuits.

Embodiments herein further include a computer program comprising instructions which, when executed by at least one processor of a device, causes the device to carry out the processing described herein. Embodiments also include a carrier containing such a computer program, wherein the carrier is one of an electronic signal, optical signal, radio signal, or computer readable storage medium.

What is claimed is:

1. A method implemented by a responding device configured to transmit messages at advertising opportunity times that occur either periodically according to an advertising interval or substantially periodically according to the advertising interval plus a pseudo-random delay, the method comprising:
   receiving a request message from a requesting device in a wireless communication system;
   responsive to the request message, determining to transmit a response message at a response time that is distinct from any of said advertising opportunity times and that occurs after at least said advertising interval has passed since receiving the request message, wherein the advertising interval is set to be at least a minimum interval required between successive transmissions by the responding device associated with advertising;
   delaying transmission of the response message until the response time, by refraining from transmitting the response message at one or more advertising opportunity times that occur after receiving the request message but before the response time; and
   transmitting the response message at the response time.

2. The method of claim 1, further comprising, after transmitting the response message, transmitting messages at advertising opportunity times that begin from the response time and occur either periodically thereafter according to the advertising interval or substantially periodically according to the advertising interval plus a pseudo-random delay.

3. The method of claim 1, wherein said determining comprises determining the response time based on a time at which the request message is transmitted or received.

4. The method of claim 1, wherein the response time is indicated in the request message.

5. The method of claim 1, wherein said determining comprises determining the response time based on a transmission format and/or transmission mechanism specified for the response message.

6. The method of claim 1, wherein said determining comprises determining the response time based on which actions the responding device is triggered to perform in response to the request message, wherein the response time occurs after an opportunity for the responding device to perform said actions.

7. The method of claim 1, wherein said advertisements are non-connectable advertisements.

8. The method of claim 1, wherein the request message is a request for neighbor or route discovery.

9. The method of claim 1, wherein the responding device is a mains powered router and the requesting device is a battery powered end-device.

10. The method of claim 1, wherein the advertising opportunity times occur substantially periodically according to the advertising interval plus a pseudo-random delay.

11. The method of claim 1, wherein the wireless communication system is an asynchronous system, wherein the request message is transmitted asynchronously with respect to the advertising interval.

12. The method of claim 1, wherein the wireless communication system is a Bluetooth Low Energy, BLE, system.

13. A method implemented by a requesting device in a wireless communication system, the method comprising:
   transmitting a request message to a responding device that is configured to transmit messages at advertising opportunity times which occur either periodically according to an advertising interval or substantially periodically according to the advertising interval plus a pseudo-random delay, wherein the advertising interval is set to be at least a minimum interval required between successive transmissions by the responding device associated with advertising;
   determining a response time at which a response message is expected to be received as a time that is distinct from any of said advertising opportunity times and that occurs after at least said advertising interval has passed since having transmitted the request message;
   after transmitting the request message, refraining from monitoring for the response message until approximately the response time.

14. The method of claim 13, wherein said refraining comprises transitioning from an awake mode to a sleep mode responsive to transmitting the request message, and transitioning from the sleep mode to an awake mode at approximately the response time, wherein the requesting device monitors for messages from the responding device in the awake mode but not in the sleep mode.

15. The method of claim 13, further comprising, responsive to monitoring for the response message at approximately the response time but not receiving the response message within a defined maximum monitoring period, returning to refraining from monitoring for the response message.

16. The method of claim 15, further comprising determining the maximum monitoring period based on an estimated or assumed clock drift between the requesting device and the responding device.

17. The method of claim 13, wherein said determining comprises determining the response time based on a time at which the request message is transmitted or received.

18. The method of claim 13, wherein the response time is indicated in the request message.

19. The method of claim 13, wherein said determining comprises determining the response time based on a transmission format and/or transmission mechanism specified for the response message.

20. The method of claim 13, wherein said determining comprises determining the response time based on which actions the responding device is triggered to perform in response to the request message, wherein the response time occurs after an opportunity for the responding device to perform said actions.

21. The method of claim 13, wherein said advertisements are non-connectable advertisements.

22. The method of claim 13, wherein the request message is a request for neighbor or route discovery.

23. The method of claim 13, wherein the responding device is a mains powered router and the requesting device is a battery powered end-device.

24. The method of claim 13, wherein the advertising opportunity times occur substantially periodically according to the advertising interval plus a pseudo-random delay.

25. The method of claim 13, wherein the wireless communication system is an asynchronous system, wherein the request message is transmitted asynchronously with respect to the advertising/interval.

26. The method of claim 13, wherein the wireless communication system is a Bluetooth Low Energy, BLE, system.

27. A responding device configured for use in a wireless communication system, the responding device comprising:
   a processor and a memory, the memory containing instructions executable by the processor whereby the responding device is configured to:
      transmit messages at advertising opportunity times that occur either periodically according to an advertising interval or substantially periodically according to the advertising interval plus a pseudo-random delay;
      receive a request message from a requesting device in the system;
      responsive to the request message, determine to transmit a response message at a response time that is distinct from any of said advertising opportunity times and that occurs after at least said advertising interval has passed since receiving the request message, wherein the advertising interval is set to be at least a minimum interval required between successive transmissions by the responding device associated with advertising;
      delay transmission of the response message until the response time, by refraining from transmitting the response message at one or more advertising opportunity times that occur after receiving the request message but before the response time; and
      transmit the response message at the response time.

28. A requesting device configured for use in a wireless communication system, the requesting device comprising:
   a processor and a memory, the memory containing instructions executable by the processor whereby the requesting device is configured to:
      transmit a request message to a responding device that transmits messages at advertising opportunity times which occur either periodically according to an advertising interval or substantially periodically according to the advertising interval plus a pseudo-random delay, wherein the advertising interval is set to be at least a minimum interval required between successive transmissions by the responding device associated with advertising;
      determine a response time at which a response message is expected to be received as a time that is distinct from any of said advertising opportunity times and that occurs after at least said advertising interval has passed since having transmitted the request message;
      after transmitting the request message, refrain from monitoring for the response message until approximately the response time.

29. The responding device of claim 27, the memory containing instructions executable by the processor whereby the responding device is further configured to, after transmitting the response message, transmit messages at advertising opportunity times that begin from the response time and occur either periodically thereafter according to the advertising interval or substantially periodically according to the advertising interval plus a pseudo-random delay.

30. The responding device of claim 27, the memory containing instructions executable by the processor whereby the responding device is configured to determine the response time based on a time at which the request message is transmitted or received.

31. The responding device of claim 27, wherein the response time is indicated in the request message.

32. The responding device of claim 27, the memory containing instructions executable by the processor whereby the responding device is configured to determine the response time based on a transmission format and/or transmission mechanism specified for the response message.

33. The responding device of claim 27, the memory containing instructions executable by the processor whereby the responding device is configured to determine the response time based on which actions the responding device is triggered to perform in response to the request message, wherein the response time occurs after an opportunity for the responding device to perform said actions.

34. The requesting device of claim 28, the memory containing instructions executable by the processor whereby the requesting device is configured to refrain from monitoring for the response message until approximately the response time by transitioning from an awake mode to a sleep mode responsive to transmitting the request message, and transitioning from the sleep mode to an awake mode at approximately the response time, wherein the requesting device monitors for messages from the responding device in the awake mode but not in the sleep mode.

35. The requesting device of claim 28, the memory containing instructions executable by the processor whereby the requesting device is further configured to, responsive to monitoring for the response message at approximately the response time but not receiving the response message within a defined maximum monitoring period, return to refraining from monitoring for the response message.

36. The requesting device of claim 35, the memory containing instructions executable by the processor whereby the requesting device is further configured to determine the maximum monitoring period based on an estimated or assumed clock drift between the requesting device and the responding device.

37. The requesting device of claim 28, the memory containing instructions executable by the processor whereby the requesting device is configured to determine the response time based on a time at which the request message is transmitted or received.

38. The requesting device of claim 28, wherein the response time is indicated in the request message.

39. The requesting device of claim 28, the memory containing instructions executable by the processor whereby the requesting device is configured to determine the response time based on a transmission format and/or transmission mechanism specified for the response message.

40. The requesting device of claim 28, the memory containing instructions executable by the processor whereby the requesting device is configured to determine the response time based on which actions the responding device is triggered to perform in response to the request message, wherein the response time occurs after an opportunity for the responding device to perform said actions.

* * * * *